(12) United States Patent
Asakura

(10) Patent No.: US 6,460,073 B1
(45) Date of Patent: Oct. 1, 2002

(54) METHOD AND APPARATUS FOR TRANSMITTING AND RECEIVING ELECTRONIC MAIL BASED UPON USER AVAILABILITY

(75) Inventor: Takayoshi Asakura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/352,054

(22) Filed: Jul. 13, 1999

(30) Foreign Application Priority Data

Jul. 14, 1998 (JP) .......................................... 10-214884

(51) Int. Cl.$^7$ ............................................. G06F 15/16
(52) U.S. Cl. ....................... 709/206; 709/202; 709/213; 709/224; 709/245
(58) Field of Search ................................ 709/200–207, 709/213–216, 223–224, 244–246; 455/412, 418–420

(56) References Cited

U.S. PATENT DOCUMENTS

| | | | |
|---|---|---|---|
| 5,765,033 A | * 6/1998 | Miloslavsky | ................ 709/206 |
| 5,832,208 A | * 11/1998 | Chen et al. | ................. 709/206 |
| 5,905,495 A | * 5/1999 | Tanaka et al. | .............. 709/206 |
| 6,185,604 B1 | * 2/2001 | Sekiguchi | ................. 709/206 |
| 6,237,027 B1 | * 5/2001 | Namekawa | ................. 709/206 |
| 6,243,739 B1 | * 6/2001 | Schwartz et al. | ........... 709/206 |
| 6,272,530 B1 | * 8/2001 | Horiuchi et al. | ............ 709/206 |
| 6,327,046 B1 | * 12/2001 | Miyamoto et al. | .......... 709/206 |

FOREIGN PATENT DOCUMENTS

| | | | | |
|---|---|---|---|---|
| JP | 3-268540 | 11/1991 | ........... | H04L/12/54 |
| JP | 3-295336 | 12/1991 | ........... | H04L/12/54 |
| JP | 8-8966 | 1/1996 | ........... | H04L/12/54 |
| JP | 8-256216 | 10/1996 | ........... | H04M/3/54 |
| JP | 9-130425 | 5/1997 | ........... | H04L/12/54 |
| JP | 10-84417 | 3/1998 | ........... | H04M/3/42 |
| JP | 10-171729 | 6/1998 | ........... | H04L/12/54 |

* cited by examiner

*Primary Examiner*—Bharat Barot
(74) *Attorney, Agent, or Firm*—Young & Thompson

(57) ABSTRACT

An electronic mail transmitting and receiving system that is capable of predicting whether or not the user can access the electronic mail transmitting and receiving system, and which is also capable of automatically controlling whether or not the electronic mail addressed to the user is transferred to an auxiliary device such as facsimile equipment, predetermined by the user. The electronic mail transmitting and receiving system is provided with a mail system monitor which monitors arrival, transmission, and reception of the electronic mail addressed to the user, a transfer propriety data generator that anticipates whether or not the user can access the mail system according to the result of the monitor and which generates a transfer propriety data based on the result of the anticipation. A mail transfer device refers to the transfer propriety data periodically at a fixed time interval. As far as it is confirmed that the transfer is appropriate, the mail transfer device transfers the electronic mail addressed to the user in the mail system to an auxiliary device predetermined by the user.

12 Claims, 11 Drawing Sheets

Fig. 2

201 {
From: pasazo@biglobe.ne.jp
To: asakura@nec.co.jp
Date: 1998/06/03 12:34:56
Subject: Meeting
Message-Id: nec1998

--------------------

202 {
This is Asakura.

Kindly please attend this meeting tomorrow.

Fig. 3

| MAIL ID | TYPE OF MONITORED RESULTS | DAY | .... | |
|---|---|---|---|---|
| nec1998 | ARRIVAL OF MAIL | 1998/06/03 13:08 | .... | 301 |
| nec1999 | ARRIVAL OF MAIL | 1998/06/03 13:30 | .... | 302 |
| qwe025 | TRANSMISSION OF MAIL | 1998/06/03 13:40 | .... | 303 |
| nec1998 | RECEPTION OF MAIL | 1998/06/03 13:53 | .... | 304 |
| nec1999 | RECEPTION OF MAIL | 1998/06/03 13:54 | .... | 305 |
| | | | | |

Fig. 4

| nec1999 | RECEPTION OF MAIL | 1998/06/03 13:54 |
|---|---|---|

Fig. 5

| MAIL ID | TYPE OF MONITORED RESULTS | DATE |
|---|---|---|
| nec1998 | ARRIVAL OF MAIL | 1998/06/03 13:08 |
| nec1999 | ARRIVAL OF MAIL | 1998/06/03 13:30 |
| qwe025 | TRANSMISSION OF MAIL | 1998/06/03 13:40 |
| nec1998 | RECEPTION OF MAIL | 1998/06/03 13:53 |
| nec1999 | RECEPTION OF MAIL | 1998/06/03 13:54 |
| | | |

Fig. 6

| | |
|---|---|
| ACCESS TIME | 00:32 |
| STORING TIME | 10:06 |
| USER MODE (TRANSFER PROPRIETY DATA) | NOT PRESENT |
| STORING MAIL NUMBER | 2 |
| STORING MAIL ID | nec1998,nec1999 |
| UPDATED TIME | 13;40 |

| LOCATION | SITUATION | DEVICE |
|---|---|---|
| DEVICE | * | PORTABLE TELEPHONE |
| * | TRANSFERRING | POCKET BELL |
| HEAD OFFICE | MEETING | PORTABLE TERMINAL |
| * | MEETING | POCKET BELL |
| | | |

1001
1002

| DATE | TIME | LOCATION |
|---|---|---|
| 1998.4.13 | 09:00 | HOME |
| 1998.4.13 | 09:33 | TAMACHI STATION |
| 1998.4.13 | 09:45 | HEAD OFFICE |
| 1998.4.13 | 12:50 | IN FRONT OF THE STATION |
| | | |

| DATE | TIME | CATEGORIE | CONTENT | LOCATION |
|---|---|---|---|---|
| 1998.4.13 | 10:00-11:30 | MEETING | MEETING FOR PLANNING | FUTYUU PLANT |
| 1998.4.13 | 13:00-14:00 | MEETING | MEETING FOR REVIEWING | HEAD OFFICE |
| 1998.4.14 | 09:00-17:00 | DEMONSTRATION | DEMONSTRATION | HEAD OFFICE |

Fig. 14

| DEVICE | LOCATION | ADDRESS | INFORMATION QUANTITY CONTROLLING METHOD |
|---|---|---|---|
| PORTABLE TELEPHONE | * | 01-333-3333 | A MAIL FROM "%FROM% TO %SUBJECT" |
| POCKET BELL | * | 01-444-4444 | A MAIL FROM "%FROM% TO %SUBJECT" |
| PORTABLE TERMINAL | * | 01-555-5555 | ALL |
| FACSIMILE | * | 01-234-5678 | SUMMARY |
| ELECTRONIC MAIL | HOME | asakura@hm1 | ALL |
| | | | |

From: pasazo@biglobe.ne.jp
To: asakura@nec.co.jp         ~1303
Date: 1998/06/03 12:34:56
Subject: Meeting   ~1304
Message-Id: nec1998
X-Device: PORTABLE TERMINAL, POCKET BELL
X-Location: HEAD OFFICE    ~1301
                           ~1302
--------------------
This is Asakura.
Kindly please attend this meeting tomorrow.

Fig. 15

From: pasazo@biglobe.ne.jp
To: asakura@nec.co.jp         ~1503
Date: 1998/06/03 12:34:56
Subject: Meeting   ~1504
Message-Id: nec1998
X-Device: PORTABLE TERMINAL, POCKET BELL
X-Location: HEAD OFFICE
X-Address: 01-555-5555, 01-444-4444   ~1501
X-QoS: all A MAIL FROM "%FROM% TO %SUBJECT"
                                      ~1502
--------------------
This is Asakura.
Kindly please attend this meeting tomorrow.

METHOD AND APPARATUS FOR TRANSMITTING AND RECEIVING ELECTRONIC MAIL BASED UPON USER AVAILABILITY

BACKGROUND OF THE INVENTION

1. Field of the Invention

The present invention relates to a technique for transmitting and receiving electronic mail, which is an electronic messages, and especially relates to a technique which anticipates whether or not an environment is satisfactory for a user to be able to access the electronic mail transmitting and receiving system, and which automatically determines and switches in response to the result of the above anticipation whether or not an electronic mail addressed at the user is transferred to the user.

2. Background Art

A conventional electronic mail transmitting and receiving system has been constituted such that, if a user does not access the system, the user cannot know whether or not an electronic mail addressed at the user has arrived. Accordingly, although an electronic mail addressed at the user has arrived at the electronic mail transmitting and receiving system, situations may occur in which a long time passes before the user receives the electronic mail.

A technique to solve such a problem is disclosed in Japanese Patent Application, First Publication No. Hei 2-58451 (hereinafter, referred to as reference 1). This conventional technique is constituted such that, when a electronic mail has arrived at the electronic mail system, a header portion of the electronic mail is transmitted to facsimile equipment, registered beforehand, and the arrival of the electronic mail and its outline are transmitted to the user.

In contrast, a conventional technique for informing the user of the content of an electronic mail that has arrived at the electronic mail transmitting and receiving equipment even when the user is not in an environment allowing operating a personal computer or an engineering work station is disclosed in Japanese Patent Application, First Publication No. Hei 9-130425 (hereinafter, referred do as the reference 2). This conventional technique is provided with additional means to the electronic mail transmitting and receiving system such as a mutual conversion means between voice and text letters; a subscriber data storage device for registering the type of receivers which indicates the type of terminal device (telephone and computer) for receiving electronic mail; a modification means for modifying the type of receiver's which are registered in the subscribers data storage device according to an instruction of the user; wherein, when an electronic mail has arrived addressed at a user using a "telephone" as the type of the receiver, the electronic mail is converted into voice by the mutual conversion means for transmitting to the user by use of a telephone line.

A problem of the conventional technique recited in the reference 1 is that, even when the user does, not think it is necessary to have the information about the arrival of the electronic mail via facsimile equipment, the information is always transmitted to the user by the facsimile equipment. That is, even when the user is in an environment allowing access to the electronic mail transmitting and receiving system for receiving the electronic mail whenever the user thinks it necessary to access to the electronic mail system, the information about the arrival of a electronic mail is always transmitted to the user, which results in generating useless communication expenses. Although it is possible to solve the above problem by additionally providing a device for executing, registration and deletion of the facsimile equipment according to the user's instruction, such additional provisions will impose a burden for the user.

The first problem of the conventional technique described in the reference 2 is that it imposes a significant burden on the user, since the users must change the type of the receiver by themselves in response to the location of the user. The second problem is that, when the receiver type is set telephone, much time is consumed before the user obtains necessary information, because the entire contents of the electronic mail are converted into voice, irrespective of the size (the line numbers, the letter numbers, and the number of bytes) of the electronic mail.

Although the above mentioned second problem may be solved by use of a technique disclosed in Japanese Patent Application, First Publication No. Hei 10-21164 (hereinafter, referred to as the reference 3), which adjusts the size of the electronic mail in response to a bandwidth of the transmission line which transmits the electronic mail, the following problem still remains even if the technique shown in the reference 3 is used. Since reference 3 takes account of only the bandwidth of the transmission line but not the capacity (a display size, a memory size, and a processing speed) of the receiver terminal, there are possibilities of causing deficient information because only a part of an electronic mail is transmitted to the receiver terminal having a high capacity connected to a transmission line having a narrow bandwidth, or causing impossible processing because all the contents of the electronic mail are transmitted to a terminal having a low capacity connected to a transmission line having a broad bandwidth.

It is therefore an object of the present invention to provide an electronic mail transmitting and receiving system which anticipates whether or not the user is in an environment allowing access to the system and automatically controls whether or not the electronic mail addressed to this user is transmitted to a transfer device such as facsimile equipment designated beforehand by the user in order to avoid useless communication. Another object of the present invention is to provide an electronic mail transmitting and receiving system which is able to transmit an electronic mail at the optimum quantity of information consistent with the capacity of the auxiliary transfer device which is available for the user at that time.

SUMMARY OF THE INVENTION

In the present invention, the present system comprises a mail system monitoring means, a transfer propriety data generating means, and a mail transfer means.

The mail system monitoring means monitors arrival of mail addressed at the user, and the state of transmission and reception of electronic mail by the user.

The transfer propriety data generating means calculates, based on information obtained by the mail system monitoring means, an average time (the access interval) for a user to access the mail system, an average value (a storing time) of time periods from the arrival of an electronic mail to the reception of the mail by the user. Furthermore, the transfer propriety data generating means, based on the access interval, the storing time, and the latest date and time at which the mail system is accessed by the user, anticipates whether or not the user is able to access to the mail system and generates a transfer propriety data based on the result of the anticipation.

The mail transfer means transfers the electronic mail to an auxiliary transfer device such as facsimile equipment, if the mail propriety data indicates it appropriate to transfer the mail when referring to the transfer propriety data at designated time intervals (such as at every fixed time interval), and also if the electronic mail addressed at the user corresponding to the above transfer propriety data is stored in the electronic mail system.

Furthermore, at the time when the user is not present in an environment allowing access to the electronic mail transmitting and receiving system, the electronic mail system of the present invention comprises a transfer device determining means and a transmitting information quantity determining means so as to transmit the content of the electronic mail at an optimum information quantity to comply with the capacity of an auxiliary transfer device.

The transfer device determining means anticipates the location where the user is located from the user location information obtained by the existing GPS or PHS or the like, and also from the user schedule information. In accordance with the result of this anticipation and the transfer device determining rule, the transfer device determining means determines a terminal (device), which is anticipated to be held by the user, as a transfer device.

The transmitting information quantity determining means determines a transmitting information quantity controlling method from the type of the transfer device determined by the transfer device determining means and a transmitting information quantity determining method.

When the electronic mail is transmitted to the transfer device determined by the transfer devices determining means, the mail transfer means controls the transmitting information quantity of electronic mail according to the controlling method determined by the transmitting information quantity determining means.

BRIEF DESCRIPTION OF THE DRAWINGS

FIG. 2 is a diagram showing an example of the content of an electronic mail.

FIG. 3 is a diagram showing an example of the content of the log file 12.

FIG. 4 is a diagram showing an example of the content of the user access data.

FIG. 5 is a diagram showing an example of the content of the user access data memory portion 30.

FIG. 6 is a diagram showing an example of the content of the transfer propriety relating data memory portion 50.

FIG. 11 is a diagram showing the content of a schedule information memory portion 90.

FIG. 13 is a diagram showing the content of an example of an electronic mail which is supplied from the transfer device determining means 70 to the transmitting information quantity determining means 110.

FIG. 14 is a diagram showing the content of a transmitting information quantity determining rule memory portion 120.

FIG. 15 is a diagram showing the content of an electronic mail which is delivered from the transmitting information quantity determining means 110 to the mail transfer means 60a.

DETAILED DESCRIPTION OF THE INVENTION

The present invention will be described in detail in accordance to referred embodiments with reference to the attached drawings.

Figure 1:
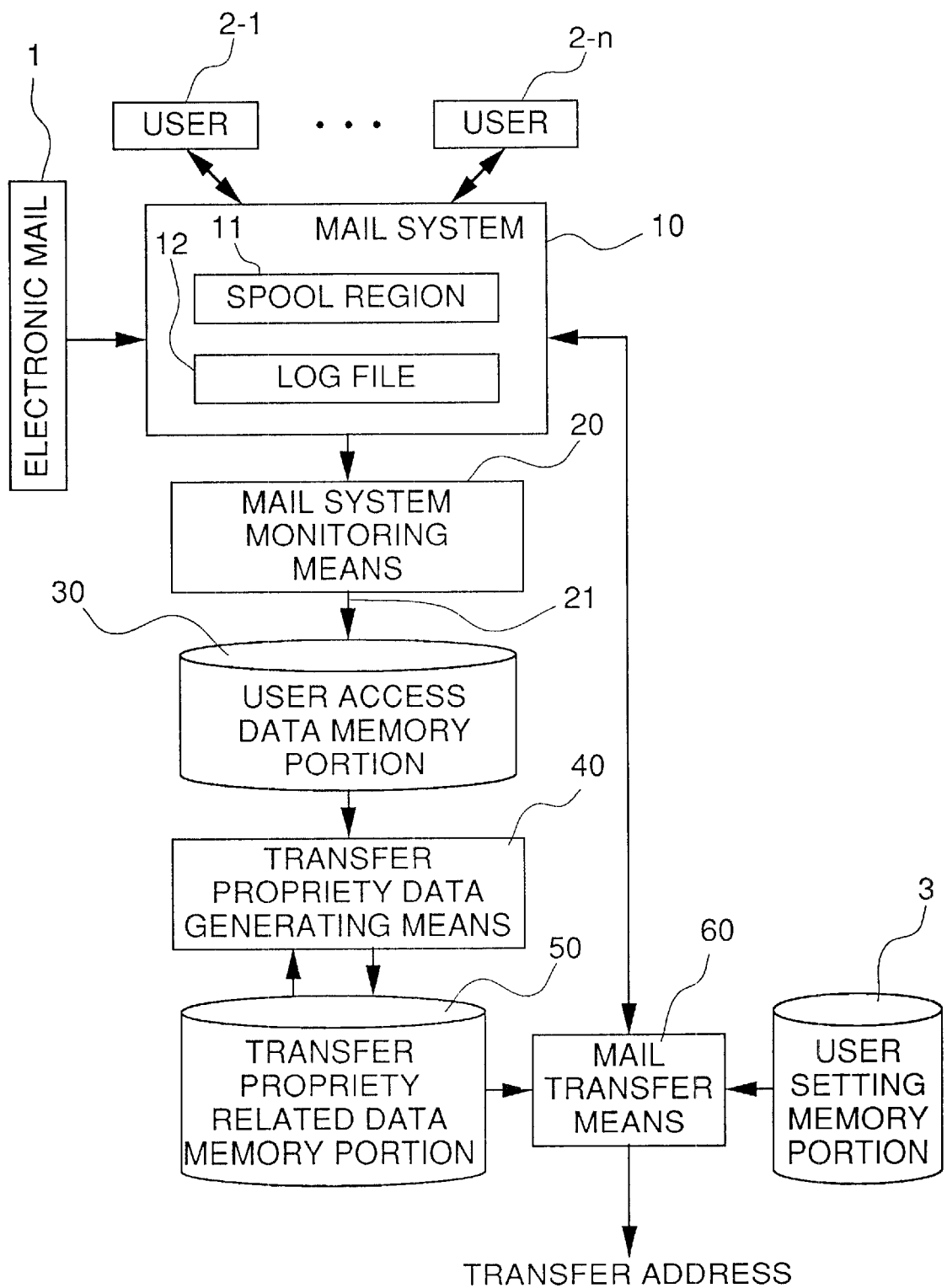
FIG. 1 is a block diagram showing a construction of an electronic mail transmitting and receiving system according to the first embodiment of the present invention.

The first embodiment of the present invention will be described with reference to the attached drawings. FIG. 1 is a block diagram showing a construction of an electronic, mail transmitting and receiving system according to the first embodiment of the present invention.

The electronic mail transmitting and receiving system of the present invention is comprised of a general mailing system 10 which receives an electronic mail 1 arriving through a network, stores it in the internal spool region 11, and, when the users 2-1 to 2-n access the system, delivers the electronic mail addressed at the user in the spool region 11 to the user after identification; a mail system monitoring means 20 which monitors the content of the log file 12 which stores the operational logs of each user 2-1 to 2-n for extracting the user access data 21 from the situation of arrival, transmission, and receiving of electronic mail addressed to each user 2-1 to 2-n; a user access data memory portion 30 for storing the user access data 21 extracted by the mail system monitoring means 20; a mail transfer propriety data generating means 40 for generating data indicating the transfer of the electronic mail is appropriate; the transfer propriety relating data memory portion 50 for storing the transfer propriety data for each user and the related data, a user setting memory portion 3 for storing the auxiliary transfer devices for each user; a mail transfer means 60 for transferring the electronic mail to an auxiliary transfer device of the user as long as the transfer propriety data permits transferring to the user when referring the transfer propriety data at a designated timing (for example, at every fixed time) and also as long as the electronic mail addressed to the user is stored in the spool region 11 of the electronic mail system 10.

The mail system 10 stores an electronic mail 1 in the internal spool region 11, when the electronic mail arrives from other mail systems. When the system 10 accepts a request from a users 2-1 to 2-n to receive the mail, the system 10 delivers the electronic mail 1 addressed at the user stored in the spool region 11 to the user, after conducting an identification process.

When a mail has arrived at the system 10 or when a user accesses (transmission or reception of mail) the system 10, the mail system 10 writes the results of operations (operational logs) to the log file which is provided in the system 10. The function of the mail system 10 described above is the same as that provided with the ordinary mail systems.

An example of an electronic mail is shown in FIG. 2. The electronic mail is composed of a header part 201 representing properties of the electronic mail such as the originator, the addressee, and the title of the of the electronic mail, and the text of the electronic mail 202.

The mail system monitoring means 20 monitors the operational logs of each user 2-1 to 2-n stored in the log file 12 of the mail system 10. When an electronic mail has arrived or when a user accesses (the type of the monitoring result, which will be described below, are either transmission or reception) the system, the mail system 10 extracts user access data 21 from the operational logs of the user who conducts the access, and stores it in the user access data memory portion 30. In the case of storing the mail access data 21 in the user access data memory portion 30, the mail system monitoring means stores user access data 21 of the same user as related matters.

An example of an operational log of a user 2-j ($1 \leq j \leq n$) stored in the log file 12 is shown in FIG. 3. The operational log includes at least a mail ID, a monitoring result type which represents the access type of electronic mail, a date, and time of the access. In addition, operational logs for the other user include the same contents.

An example of the user access data 21 extracted by the mail system monitoring means 20 is shown in FIG. 4. The user access data 21 is composed of a mail ID, a type of the monitored result, and a date and the time of an operation. An example shown in FIG. 4 indicates that a user has "received" an electronic mail having the mail ID "nec1999" at "13:54 on Jun. 3, 1998", which corresponds to the user access data generated immediately after recording 305 in FIG. 3 in the log file 12. The mail ID described above corresponds to "nec 1998" in one example of the electronic mail shown in FIG. 2.

A user access data of a user 2-j stored in the user access data memory portion 30 is shown in FIG. 5 as an example of the user access data. As shown in the figure, the user access data of the user 2-j is a set of a plurality of operational logs related to the user 2-j, and the items are the same as those shown in FIG. 3.

When the user access data memory portion 30 is updated, that is, when a user access data 21 for a user 2-j is stored in the user access data memory portion 30, the transfer propriety data generating means 40 calculates and obtains an access interval, a storing time, a user mode (transfer propriety data), an electronic mail number for storing, a mail ID number for storing, and the updated time for a particular user 2-j, and stores those in the transfer propriety related data memory portion 50.

FIG. 6 is a diagram showing an example of the transfer propriety related data for a user 2-j in transfer propriety related data for respective users, and the transfer propriety related data is composed of the access interval 601, the storing time 602, the user mode 603, the number of stored mail 604, the stored mail IDs 605, and the update time 606 for the user 2-j.

The access interval 601 is an average value of intervals of accesses (transmission and reception) by a user 2-j to the mail system 10, and the access interval is calculated as follows. First, data which have the types of monitored results of "reception" and "transmission" are extracted from the data of a user 2-j stored in the user access data memory portion 30 and differences of those access times are then calculated as unit access intervals and the average interval is obtained by averaging unit access intervals. In the example shown in FIG. 5, the time difference between 503 and 504 in FIG. 5 is 13 min. and the time difference between 504 and 505 is one min., and thus the access interval for a user 2-j of 7 min. is obtained by dividing the sum of those two intervals 13+1 by 2.

The storing time 602 is the average time from arrival of an electronic mail to the reception by the user 2-j, and the storing time is calculated as follows. The data which have of the monitored result type of either "arrival" or "reception" are extracted from the user access data for the user 2-j, and the time interval from the arrival of an electronic mail to the reception of the mail by the user 2-j is calculated as the unit storing time, and the storing time is obtained by averaging those unit storing times. In the example shown in FIG. 5, the time difference between 501 and 504 is 45 min. (the storing time of an electronic mail with the ID of "nec1998"), and the time difference between 502 and 505 is 24 min., so that the storing time for a user 2-j is obtained as 34 min. 30 sec by dividing the sum of those unit storing times 45+24 min. by 2.

The user mode 603 represents whether or not a user 2-j is in an environment allowing access to the mail system, that is, the whether or not the electronic mail addressed at a user 2-j stored in the spool region 11 can be transferred. The environment allowing access to the mail system (the transfer of the electronic mail is not possible) is represented as "present", and the environment unable to access the mail system (transfer of the electronic mail is possible) is represented as "not present". The user mode 603 forms the transfer propriety data which represents the propriety of transferring the mail.

The user mode 603 is determined as follows.

When the current user mode is "not present", and the monitored result type is "reception" or "transmission, the user mode is converted into "present".

When the current user mode is "present", and when the monitored result type of the updated content of the user access data memory portion 30 is "reception", the shorter time in between the access interval and the storing time is defined as the restraint time. In addition, the restraint completion time is defined by the addition of the restraint time to the updated time, and if the restraint completion time is in the past, then the user mode is determined as "not present". In other cases, the user mode does not change.

The stored mail number 604 indicates the number of electronic mail addressed at a user 2-j and stored in the spool region 11 of the mail system 10.

The stored mail IDs 605 indicates the mail IDs of the electronic mail addressed at a user 2-j, which are stored the spool region 11 of the mail system 10.

The updated time 606 indicates the most recent that the mail system 10 has been accessed either for transmitting or receiving an electronic mail addressed at a user 2-j. In order to store the updated time 606 in the transfer propriety related data memory portion 50, the transfer propriety data generating means 40 executes the following processing. When at least one of the access intervals and the storing time for a user 2-j used for the concurrent calculation differs from the access time or the storing time for a user 2-j stored in the transfer propriety relating data generating portion 50, the stored updated time 606 is replaced with the present time.

Figure 7:
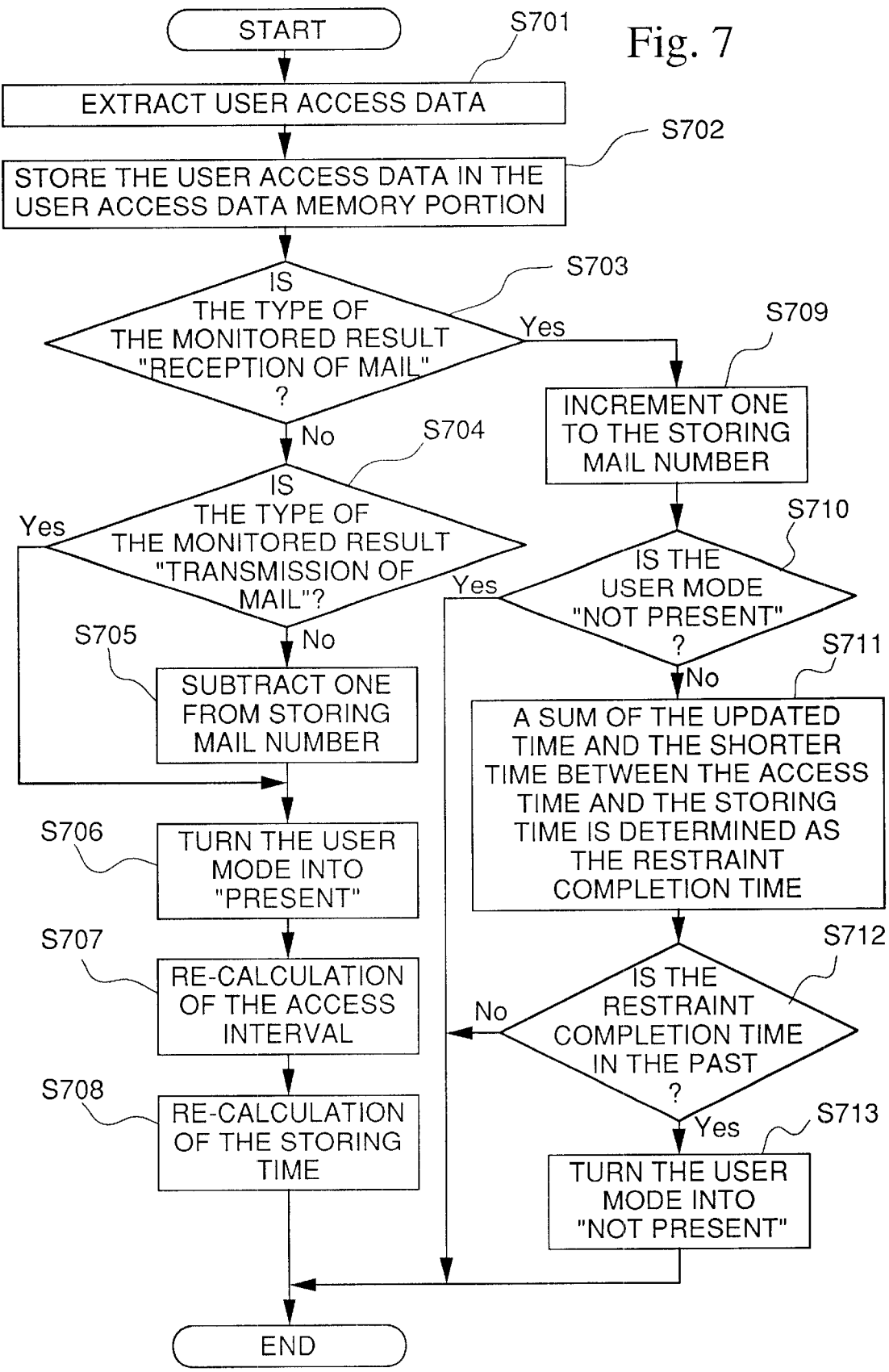
FIG. 7 is a flow diagram showing an example of processing executed by the mail system monitoring means 20 and the transfer propriety data generating means 40.

Hereinafter, the operations of the mail system 10 when an electronic mail has arrived at the system and when a user 2-1 to 2-n accesses the mail system will be described with reference to a flow diagram shown in FIG. 7.

When the content of the log file is updated, that is, a new electronic mail has arrived at the mail system 10, the mail system monitoring means 20, which always monitors the content of the log file 12 of the mail system 10, extracts the user access data from the updated content and obtains a user name to which the electronic mail addresses or the name of the user who conducted transmission or reception of the electronic mail (S701).

If, for example, an updating is executed so as to add an operational log 305 of a user 2-$j$ as shown in FIG. 3, the mail system monitoring means 20 stores the extracted user access data 21 in the user access data memory portion 30 (S702). The mail system monitoring means 20, at that time, stores the extracted user access data 21 extracted at the present time, based on the name of the user obtained at S701, in connection with the user access data of the above mentioned user already stored in the user access data memory portion 30.

The transfer propriety data generating means 40 executes sequential processing steps after S703.

If the type of the monitored results of the user access data, which is newly added to the user access data memory portion 30, is "transmission" (S703N→S704Y), the user mode of the user (the user 2-$j$) obtained at S701, which is stored in the transfer propriety related data memory portion 50, is converted into "present" (S706).

The access interval of the user 2-$j$ is re-calculated and the access interval of a user 2-$j$ stored in the transfer propriety related data memory portion 50 is replaced with the re-calculated result (S707). If the re-calculated access interval differs from that connecting to the user 2-$j$ stored in the transfer propriety related data memory portion 50, the access interval updating time related to a user 2-$f$ is also updated to the present time.

Subsequently, the storing time for a user 2-$j$ is re-calculated, and the storing time for a user 2-$j$ stored in the transfer propriety related data memory portion 50 is replaced with the re-calculated result (S708). At this time, if the re-calculated storing time differs from the storing time stored in the transfer propriety related data memory portion 50, the update time is updated to the present time.

In contrast, if the type of the monitored results of the user access data, newly added to the user access data memory portion 30, is "reception" (S703N→S704N), −1 is added to the number of the electronic mail related to a user 2-$j$, obtained at S701 and stored in the transfer propriety related data memory portion 50 (S705), Bond the above described processing below S706 is executed.

If the type of the monitored results of the newly added user access data 21 to the user access data memory portion 30 has been "reception" (S703Y), the number of mails related to a user 2-$j$ stored in the transfer propriety related data memory portion 50 is incremented by one (S709).

Subsequently, the user mode of the user 2-$j$ is judged (S710). If it is judged that the user mode is "not present" (S710Y), then this processing is completed. However, if the user mode of the user 2-$j$ is determined to be "present" (S710N), a sum of the update time and the shorter time between the access time and the storing time for the user 2-$j$ is defined as the restraint completion time (S711), and a judgement is executed concerning whether or not the restraint completion time is prior to the present time (in the past)(S712).

If the restraint completion time is prior to the present time (the past)(S712Y), after the users mode is converted into "not present" (S713), this processing routine is completed.

In contrast, if the restraint completion time is subsequent to the present time (in the future), then the processing is immediately terminated.

Figure 8:
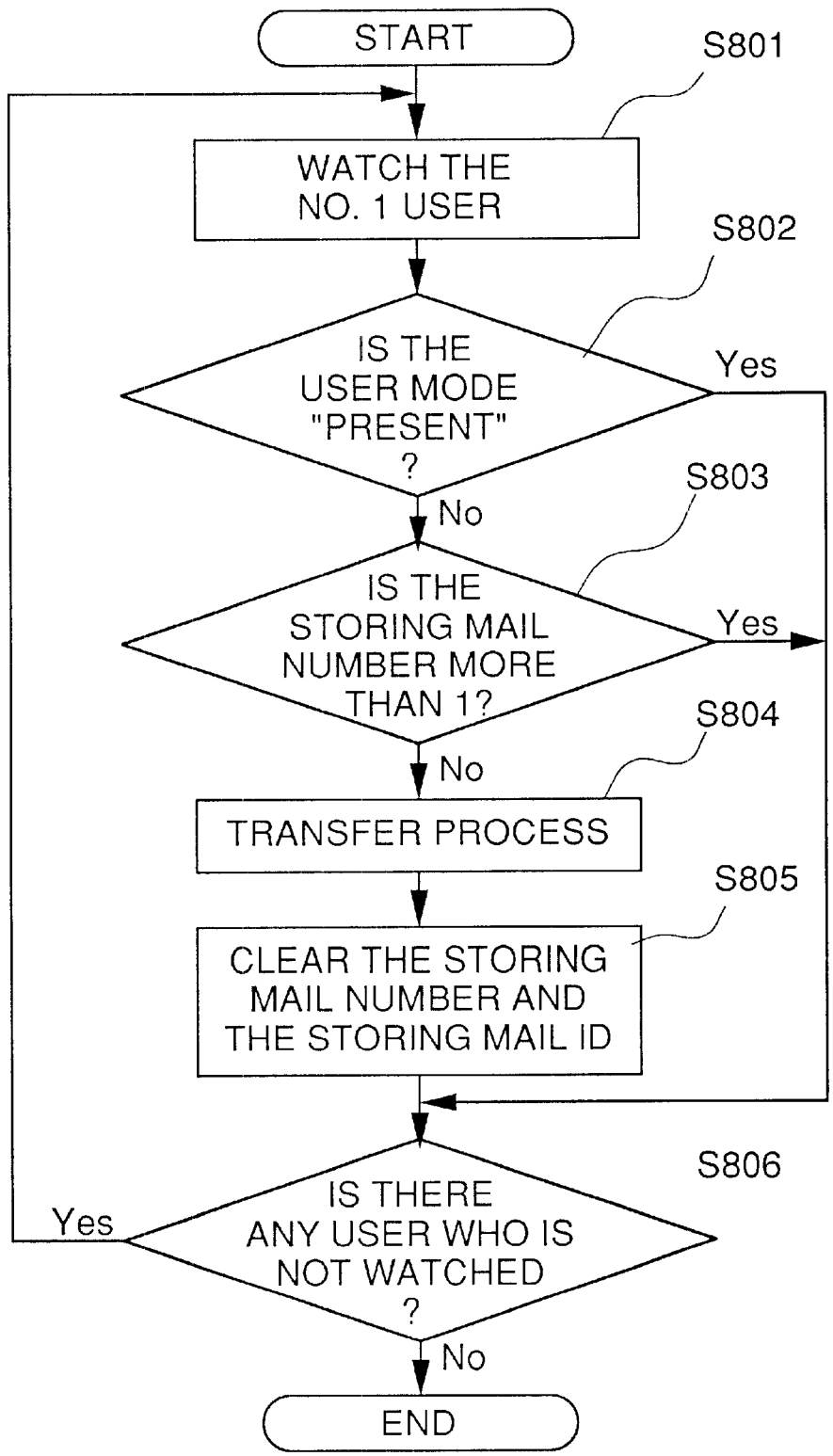
FIG. 8 is a flow diagram showing processing by the mail transfer means 60.

Hereinafter, an operation of the mail transfer means 60 is described with reference to the flow chart shown in FIG. 8.

The mail transfer means 60 monitors a particular user (for example, 2-$j$) among many users 2-1 to 2-$j$ (S801) periodically. If the user mode of the particular user 2-$j$ stored in the transfer propriety related data memory portion 50 turns out to be "present" (S802Y), the processing is completed providing that there is no other user who is monitored (S806N). If there is a user who is not monitored, the process S801 is repeated.

In contrast, if the user mode of the user 2-$j$ is "not present" (S802N), a judgement is executed concerning whether or not the number of the stored mail is more than one.

If the number of the stored mail is zero (S803N), the process goes to S806. If the number of the stored mail is more than one (S803Y), the process of transfer is executed (S804).

The following processing is executed in the transfer process of S804. First, the mail IDs concerning the user 2-$j$ stored in the transfer propriety related data memory portion 50 are obtained, and a request to deliver those electronic mail having the above mail IDs goes to the mail system 10. The mail system 10 extracts those electronic mail from the spool region 11 in response to the above request, and delivers them to the mail transfer means 60. When the mail transfer means 60 receives the concerned electronic mail, the mail system 10 obtains information about the auxiliary transfer device of the user 2-$j$ from the user setting memory portion 3, and transfers the information to the auxiliary transfer device. Here, the information on the auxiliary transfer device includes the numbers of the facsimile equipment, such as 01-234-5678; the other electronic mail addresses, such as "asakura@ hml; and numbers of the mobile phones such as 87-654-3210. When devices to be transfered to are facsimiles or mobile phones, the mail system 10 first converts the content of the electronic mail into a receivable form by those devices before transferring to the address.

When the transfer process of S804 is completed, the mail transfer means 60 clears the number of the stored mails and stored mail IDs related to the user 2-$j$ (S805). The mail transfer means 60 repeatedly executes the above processes until all users are monitored (until S806 is turned into N).

Moreover, when it is judged at S803 that the number of the stored mail is more than one, the transfer process of S804 is set to be executed immediately as shown in FIG. 1. However, another method of processing may be adapted, in which the transfer process is executed only when the user mode of a user who isbeing monitored at present remains "not present", even if it exceeds a designated time after it is judged in S804 that the number of the stored mail is more than one, and the processing is completed if the user mode converts into "present" before the designated time passes. It is possible to adapt a shorter time periods between the access time and the storing time of the user being monitored at present as the above described designated time.

As described above, since the present system of the present invention makes it possible to automatically switch the electronic mail either to transferring or not transferring in accordance to an environment of the user, it is possible to avoid the waste of the electronic mail being transferred to the auxiliary transfer devices such as the facsimile equipment or the mobile telephones, when the user is in an environment allowing access to the electronic mail system, without requiring for the user to carry out a particular operation to change the setting for the transfer.

Figure 9:
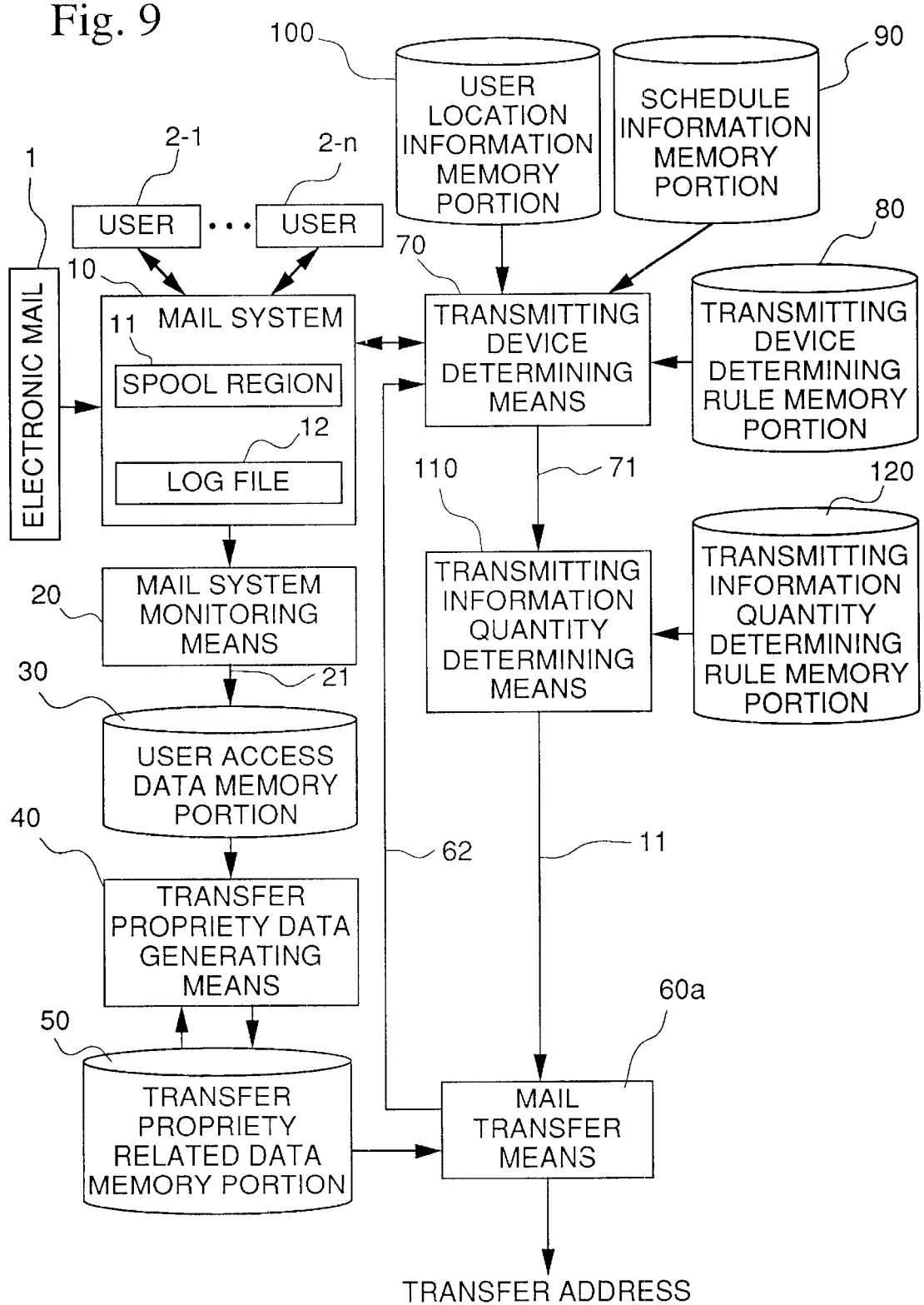
FIG. 9 is a block diagram showing a construction of an electronic mail transmitting and receiving system according to the second embodiment of the present invention.

Hereinafter, the second embodiment of the present invention will be described with reference to the drawing. FIG. 9 is a block diagram showing the mail transmitting and receiving system according to the second embodiment of the present invention.

The second electronic mail transmitting and receiving system comprises a general mail system for receiving an electronic mail 1 arrived through the network and holding it in the internal spool 11, and for delivering the electronic mail addressed at a user in response to a request by users 2-1 to 2-j which is stored in the spool region 11; a mail system monitoring means 20 for monitoring the content of a log file 12 which stores operational logs of the user 2-1 to 2-n and for extracting user access data which represents arrival, transmission, and reception of electronic mail addressed at each user 2-1 to 2-n; a user access data memory portion 30 for storing the user access data 21 extracted by the mail system monitoring means 20; a transfer propriety data generating means 40 for generating the transfer propriety data which indicates whether or not it is appropriate to transfer the mail; a transfer propriety related data memory portion 50 which stores the transfer propriety data for each user; a transfer device determining means 70 for determining the transfer device for an electronic mail; a transfer device determining rule memory portion 80 for storing the transfer device determining rule; a schedule information memory portion 90 for storing the schedule information of the user; a user location information memory portion 100 for storing the location of the user; a transmitting information quantity determining means 110 for deciding a method to adjust the quantity of the transmitting information and a transmitting address, when the electronic mail is transmitted to the predetermined transfer device determining means 70; a transmitting information quantity determining rule memory portion 120 for storing the transmitting information quantity determining rule; and a mail transfer means 60a for transferring the electronic mail, the information quantity of which is determined by the transmitting information quantity determining means 110, to the transfer device determined by the transfer device determining means 70 (the transfer address is determined by the transfer information quantity determining means 110); wherein, while the transfer propriety data stored in the transfer propriety data memory portion 50 is monitored at a designated timing (e.g. a fixed interval), and only when the transfer propriety data is converted into appropriate for transfer and the electronic mail addressed at the user is stored in the spool region 11 of the mail system 10. Since constructions and operations of the mail system 10, the mail system monitoring means 20, the user access data memory portion 30, the transfer propriety data generating means 40, and the transfer propriety related data memory portion 50 are the same as those of the first embodiment of the present invention, the explanations of those elements are omitted.

Figure 10:
FIG. 10 is a diagram showing the content of a transfer device determining rule memory portion 80.

The transfer device determining rule memory portion 80 stores the transfer device determining rule for each user 21- to 2-j, for deciding the transfer device from the user's location and the environment. An example of the transfer device determining rule for the user 2-j is shown in FIG. 10. The line, for example, with the numeral 1001, shown in this example, represents the rule that, when the location is the "head office" and the situation is "meeting", "the portable terminal" is selected as the transfer device.

The schedule information memory portion 90 stores schedule information of each user 2-1 to 2-n. The schedule information is composed of days, time, a scheduled category, a content of the schedule, and a location. An example of a table showing schedule information for a user 2-j stored in the schedule information memory portion 90 is shown in FIG. 11. One line in the table represents one schedule, and the line with a numeral 1101 represents the scheduling of a user to attend "a meeting" at "the head office" "from 13:00 to 14:00 on Apr. 13, 1998".

Figure 12:
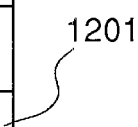
FIG. 12 is a diagram showing the content of a user location information memory portion 80.

The user location information memory portion 100 stores the user location information of each user 2-1 to 2-n. The user location information is composed of the day, time, and the location, and it shows where the user has been located. An example of tables showing user location information is shown in FIG. 12. The line with the numeral 1201 denotes that the user was in front of a station at 12:50 on Apr. 13, 1999. It is possible to generate the user location information by use of conventional techniques such as GPS or PHS.

When the transfer device determining means 70 receives a request 62 for deciding the transfer address and the information quantity of a mail including a mail ID from the mail transfer means 60a, then it requests that the mail system 10 supplies the electronic mail with such a mail ID. When the transfer device determining means 70 receives the concerned electronic mail from the mail system 10, it stores the mail and extracts the content of the To header which shows the address of the mail.

Subsequently, the transfer device determining means 70 obtains schedule information and location information for a user (assumed to be a user 2-j) address extracted from the schedule information memory portion 90 and the user location information memory portion 100, and the location and the situation of the user 2-j at this time is determined.

Here, the situation of the user is a value included in the category of schedule information. For example, when the schedule information shown in FIG. 11 is used, the situation of the user at that time is "at a meeting", if the time is 13:30 and the day is April, 13th.

The location of the user is a value belonging to a category of the "location" in the schedule information or the schedule location information, and the user's location is determined by either the user schedule information or the user location information, based on the following rule. If a location where the user is located a designated past time (term of validity of user location information) is recorded in the user location information, the newest information is used; and if the location at a designated time before is not recorded, the value of "location" in the schedule information is adapted. For example, if the time is 13:30, and if the term of validity of the user location information is 30 min., the valid term of the user location information is limited to be from 13:30–30=13:00. If the user location information shown in FIG. 12 is used, the present "location" of "in front of the station" at 12:50 on the line 1201 cannot be adapted and the value in the table "head office" (the location shown in the line 1101 of FIG. 11) is adapted.

When the location and the situation of the user are determined, the transfer device determining means extracts a transfer device determining rules which are consistent with the location and situation of the user. When the location is the "head office", and the situation is "at a meeting", if the transfer device determining rule 80 shown in FIG. 10 is used, the transfer device determining rules shown in lines 1001 and 1002 are selected which correspond to "a portable terminal" and "a pocket bell".

Furthermore, the transfer device determining means 70 adds the determined transfer device and the location of the user to the header portion of the electronic mail and delivers the electronic mail as the device determined electronic mail 71 to the transmitting information quantity determining means 110.

An example of the device determined electronic mail 71 which added the transfer device and the location to its header portion is shown in FIG. 13. The numeral 1301 denotes that the "portable terminal" and the "pocket bell" have been selected as the transfer devices, and 1302 denotes that the location is the "head office".

An example of a transmitting information quantity determining rule for a user 23-$j$ out of transmitting information quantity determining rules for users 2-1 to 2-$n$ is shown in FIG. 14. The transmitting information quantity determining rule is composed of the transfer device, the location of the user, the transmitting address, and a method for adjusting the information quantity. The numeral 1401, indicates that, when the transfer device is the "pocket bell", an electronic mail is transmitted to the address of 01-444-4444, entitled "A Mail from thee From Header to the Subject Header" by extracting the From Header and the Subject Header. The letter line enclosed by the character % represents names of the headers. The line 1402 indicates that, when the transfer device is the "portable terminal", then the whole test is transmitted to the address 01-555-5555. The numeral 1403 indicates that, when the transfer device is a "facsimile", a "summary of the mail" is transmitted to an address 01-234-5678. The numeral 1403 indicates that, when the transfer device is the "electronic mail" and the location is "home", the "whole text" is transmitted to the mail address of "asakura@ hml".

The transmitting information quantity determining means 110 extracts the content of the To header, when it receives the device determined electronic mail 71, and further extracts the transmitting information quantity rule for a user (assumed the user is 2-$j$) which is specified by the content of the To header extracted as shown above from the transmitting information quantity determining rule memory portion 120. Subsequently, the transmitting information quantity determining means 110 extracts the contents consistent with they transfer device and the user location, which are written in the device determined electronic mail 71, from the transmitting information determining rule of the user 2-$j$, and it acquires the transferring address of the electronic mail and the method of controlling the information quantity.

When the device determined electronic mail 71 is supplied, the transmitting information quantity determining means 110 acquires it, since the transfer device is the portable terminal and the pocket bell, which are consistent with the numerals 1401 and 1402 of FIG. 14, the transmitting address and the method of controlling the information quantity for the pocket bell are "01-44-4444" and "the mail from %From% to %Suject%", respectively; and the transmitting address and the method of controlling the information quantity for the portable terminal are "01-555-5555" and "all" (the whole text is transmitted).

The transmitting information quantity determining means 110 makes an addition of the transmitting address and the information quantity controlling method to the electronic mail, and delivers the added header to the mail transmitting means 60a. An example of an electronic mail to which the transmitting address and the information controlling method are added is shown in FIG. 15. The numeral 1501 indicates the recruited transmitting address, and the numeral 1502 indicates the recruited information controlling method.

Similar to the mail transfer means 60, the mail transfer means 60a refers to the transfer propriety related data memory portion 50 peridically, and judges the propriety of transferring electronic mail to each users 2-1 to 2-$n$. That is, the mail transfer means 60a monitors a particular user (assumed to be the user 2-$j$), and it studies whether or not the user mode of the user 2-$j$ stored in the transfer propriety related memory portion 50 is "not present", and whether or not the stored mail number is "more than 1". If the user mode of the user 2-$j$ is "not present" and if the stored mail number is "more than 1", the mail transfer means 60a judges that it is possible to transfer the mail, and, if the above conditions are not satisfied, it is determined that the mail transfer is denied. The above processing is the same processing performed by the mail transfer means 60.

If it is judged that the transfer of the electronic mail addressed at the user 2-$j$ is denied, similar processing is executed for the electronic mail addressed at the other users. In contrast, if it is judged that the transfer of the electronic mail is possible, the mail transfer means 60a issues a request 62 that the transfer device determining means 70 determines the transmitting address and the information quantity. This transmitting address and the information quality determining request 62 includes a mail ID of a user 2-$j$, which is stored in the transfer propriety related data memory portion 50.

In response to the transmitting address and the information quantity determining request 62, the transfer device determining means 70 outputs a device determined electronic mail 71, the transmitting information quantity determining means 110 adds the additional information of the information quantity controlling method, and the user's address to the transfer device determined electronic mail 711 at the header, and the mail transfer means 60a controls the information quantity, based on the information quantity controlling method written in the header of the electronic mail 111. In the example of electronic mail shown in FIG. 15, since the information quantity controlling method is "all" as shown by 1502, the information quantity will not be controlled. Since the information controlling method for the pocket bell is, as shown by 1502, "the mail from %FROM% to %Subject%", and the contents of the "From" header 1503 and the "Subject" header 1504 are "pasazo@biglobe. ne. jp.", and "meeting", respectively, the content of the transmitting mail is converted to by the information quantity control method "a mail from pasazo@biglobe. ne. jp to meeting".

Subsequently, the mail transfer means 60a converts the information quantity controlled electronic mail 111 to the media suitable for the transfer device and transmits it to the address of 1501. The mail transfer means 60a executes such processing for all electronic mail (electronic mail addressed at the user 2-$j$ and stored in the mail system 10).

When the processing for the user 2-$j$ is completed, the mail transfer means 60a repeatedly executes such processing until no monitored mail remains.

Figure 16:
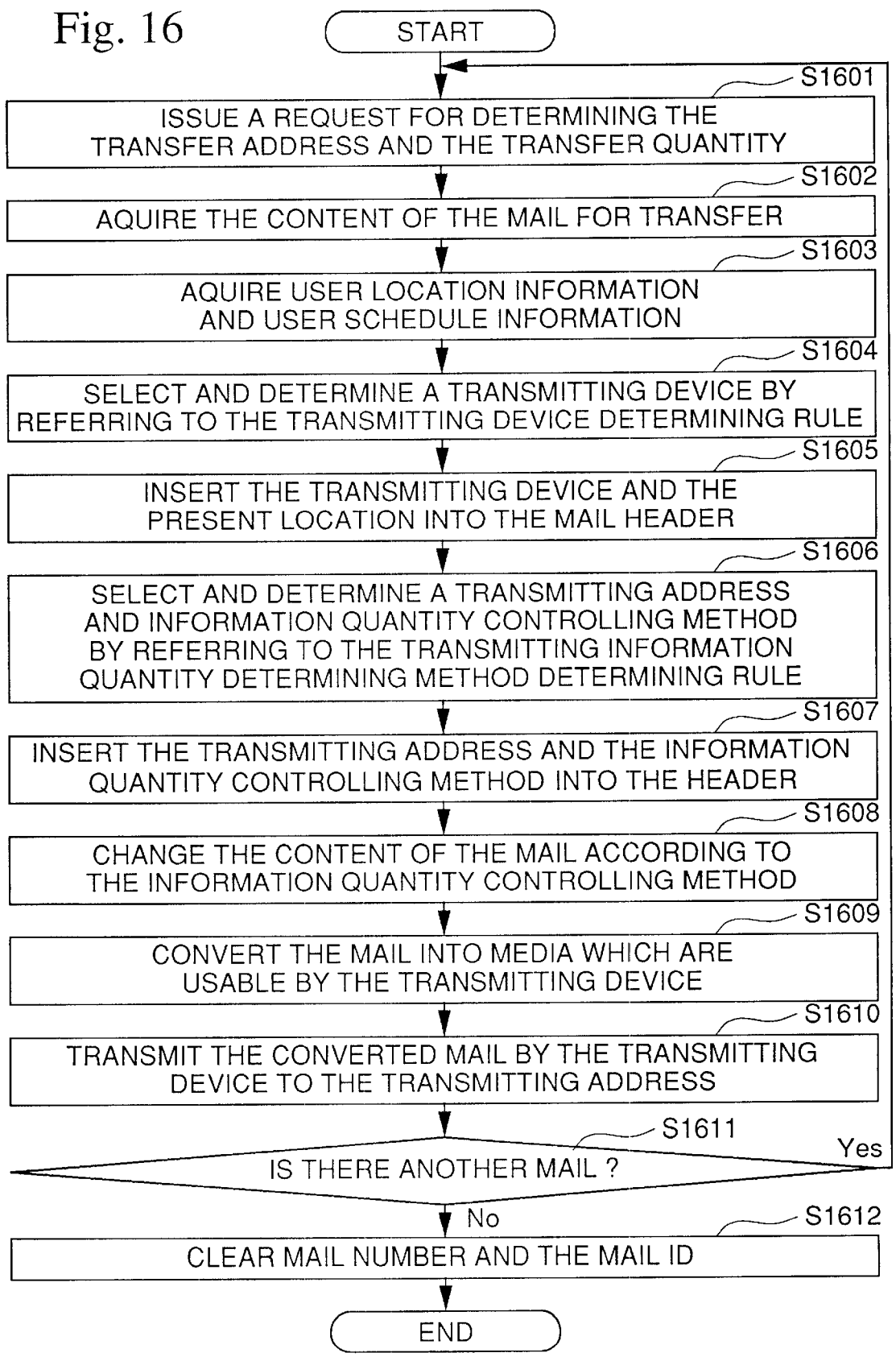
FIG. 16 is a flow diagram showing a processing example after the mail transfer means has determined the transfer of the mail.

Hereinafter, the operation of the mail transfer means 60a will be described with reference to the flow diagram shown in FIG. 16 after the transfer of an electronic mail to a particular user (e.g. the user 2-$j$) is approved. The other operations which are not described hereinafter are the same as those described in the first embodiment.

When the mail transfer means 60a judges that the electronic mail can be transferred to the user 2-$j$, the mail transfer means 60a issues a request that the transfer device determining means 70 determines the transfer address and the information quantity including an ID of the storing mails for the user 2-$j$ stored in the transfer propriety related data memory portion 50 (S1601). If the ID of the stored mails for the user 2-*j* is such as, for example, shown in FIG. 6, the mail transfer means 60*a* submits to the transfer device determining means 70 a request 62 for determining the transmitting address and the information quantity including "Nec1998" or "Nec1999".

The transfer device determining means 70 acquires an electronic mail having an ID which is included in the transmitting address and the information quantity determining request 62 (S1602). The transfer device determining means 70 then acquires the schedule information and the user location information for the user 2-*j* from the schedule information memory portion 90 and the user location information memory portion 100, and determines the location and situation of the user 2-*j* (S1603). The transfer device determining means 70 further acquires a transfer device determining rule which is consistent with the location and situation of the user 2-*j* from the transfer device determining rule memory portion 80, and determines the transfer device (S1604). Subsequently, the transfer device determining means 70 produces a device determined electronic mail 71, in which the above determined transfer device and the location of the user are inserted at the header portion of the electronic mail acquired in 1602 and delivers it to the transmitting, information quantity determining means 110 (1605).

The transmitting information quantity determining means 110 extracts the transfer device and the location from the header of the device determined electronic mail 71, and selects a transmitting information quantity determining rule out of transmission information quantity determining rules for the user 2-*j* which are stored in the transmission information quantity determining rule memory portion 120, and determines the transmitting address and the information quantity controlling method (S1606). An electronic mail is produced by inserting the above determined transmitting address and the information quantity controlling method in the header of the device determined electronic mail 111 and the electronic mail is delivered to the mail transfer means 60*a* (S1607).

The mail transfer means 60*a* controls the information quantity of the electronic mail (S1608). When it is desired to transfer an electronic mail in the text form to, for example, the mobile phone (S1609), the mail transfer means 60*a* converts the electronic mail into voice suitable for the transfer device. The converted data are transmitted to the transmitting address 1501 which is described in the, header portion (S1610).

When other electronic mail addressed at the user 2-*j* are stored in the other mail system 10 (S1611Y), the processing is repeated from S1601. When processing is completed for all of the electronic mail to be transmitted (S1611N), the storing number for the user 2-*j* stored in the transfer propriety related data memory portion 50 is set to zero, the content of the storing mail ID is also cleared, and the processing is completed.

As hereinabove described, since the transfer device and the transmitting address are automatically switched in accordance with the location and situation of the user and the user's terminal (device), and furthermore, since the information quantity is automatically controlled depending upon the user's device, the user, wherever the user is located, can receive the electronic mail which is controlled to comply with the user's device and which has a controlled information quantity in conformity with the user's device.

Figure 17:
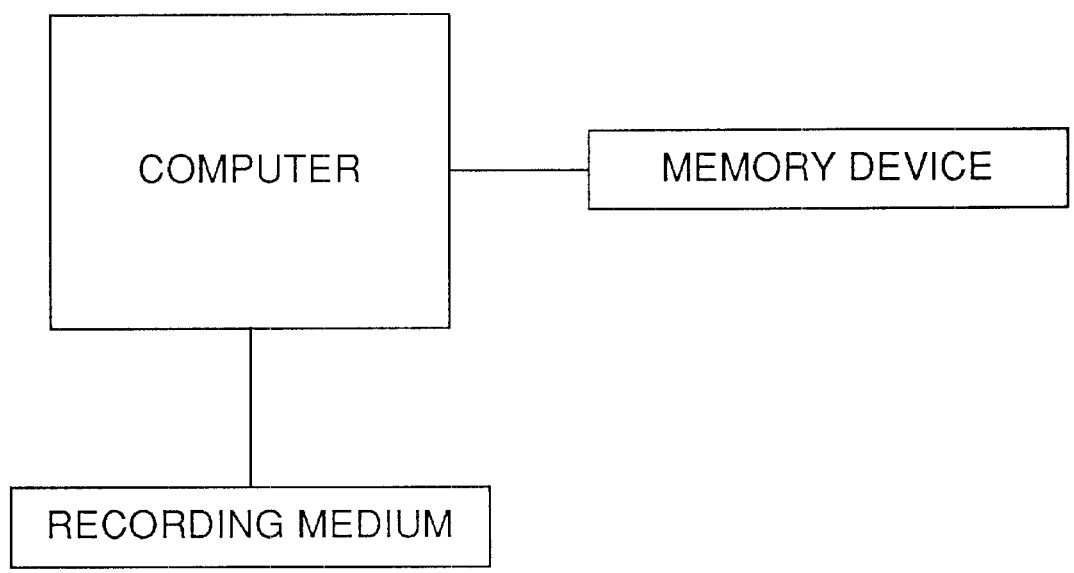
FIG. 17 is a diagram showing a structural example of a hardware for providing an electronic mail transmitting and receiving system.

FIG. 17 is a diagram showing an example of the structure of the hardware for providing the electronic transmitting and receiving system shown in FIG. 1 or FIG. 9. The system is constituted by a computer 1702, a recording media 1702, and a,memory device 1703. Examples of the recording media 1702 include various types of media such as semiconductor memories, discs, and the like, and the recording media stores programs for operating the computer as an electronic mail transmitting and receiving system.

When it is desired to provide the electronic mail transmitting and receiving system shown in FIG. 1, the programs recorded in the recording media 1702 are read by the computer 1701 and the mail system 10, the mail system monitoring means 20, the transfer propriety data generating means 40, and the transfer propriety related data memory portion 60 are provided on the computer 1701 shown in FIG. 1. At the same time, the user access data memory portion 30, transfer propriety related data memory portion 50, and the user setting memory portion 3 are provided on the memory device 1703 comprised of disc devices etc.

In order to provide the electronic mail transmitting and receiving system shown in FIG. 9, the programs stored in the recording media 1702 are read by the computer 1701, and by controlling the operations of the computer 1701, the mail system 10, the mail system monitoring means 20, the transfer propriety data generating means 40, the mail transfer means 60*a*, the transfer device determining means 70, and the transmitting information quantity determining means 110 are provided on the computer 1701. The user access data memory portion 30, the transfer propriety related data memory portion 50, the transfer device determining rule memory portion 80, the schedule information memory portion 90, the user location information memory portion 100, and thee transmitting information quantity determining rule memory portion 120 are provided on the memory device 1703 comprised of disc devices etc.

As described above, the present invention provides an electronic mail transmitting and transfer device which, based on an evaluation of the user's environment in terms of arrival, transmission, and reception of the electronic mail addressed at the user, determines whether or not the electronic mail is transmitted to the user in accordance with the estimated user's environment. Therefore, it is possible to avoid, waste that, even when the user is in an environment wherein the electronic mail transmitting and receiving system can be accessed by the user, the electronic mail is transmitted not to the system, but to the other auxiliary transfer devices such as facsimile equipment or mobile phones.

Moreover, since the electronic mail transmitting and receiving system of the present invention is designed so as to determine the transfer device by anticipating the user's location and by using the transfer device determining rule selected by the result of the anticipation, the user can receive the electronic mail, even when the user is in an environment wherein the electronic mail transmitting and receiving system cannot be accessed by the user, without operating the system for switching the transfer devices to the other auxiliary transfer devices.

Furthermore, since the information quantity of an electronic mail is controlled so as to be suitable for the transfer device, it is possible to transfer the electronic mail in the optimum quantity for the capacity of the transfer device available for the user at that time.

What is claimed is:

1. An electronic transmitting and receiving system which stores electronic mail addressed at the user and comprises a mail system for transmitting said storing electronic mail to said user in response to the user's demand to receive said electronic mail, the electronic mail transmitting and receiving system comprises:

a mail system monitoring means for monitoring arrival of an electronic mail addressed at said user, and the state of transmission and reception of electronic mail by said user;

a transfer propriety data generating means for generating a transfer propriety data which indicates whether or not it is appropriate to transfer the electronic mail addressed at said user and stored in said mail system based on the state of arrival, transmission, and reception of the electronic mail obtained by the mail system monitoring means; and a mail transfer means for transferring said electronic mail addressed at said user and stored in the mail system to an address predetermined for said user, if the transfer is approved by periodically referring to the transfer propriety data at designated time intervals and if an electronic mail is stored in the mail system.

2. An electronic mail transmitting and receiving system according to claim 1, wherein, said mail system monitoring means is constructed such that it monitors the arriving date and time of an electronic mail as said state of arrival of the electronic mail, the transmitting date and time of an electronic mail as said state of transmission of the electronic mail, and the receiving date and time of an electronic mail as said state of reception of the electronic mail; and said transfer propriety data generating means is constructed such that it obtains, based on information obtained by the mail system monitoring means, an access interval which is an average storing time in the mail system obtained as an average value of time periods from the arrival of an electronic mail to the reception of the mail by the user, and it further anticipates, based on the access interval, the storing time, and the most recent date and time at which the mail system is accessed by the user, whether or not the user is able to access to the mail system and generates a transfer propriety data based on the result of the anticipation.

3. An electronic mail transmitting and receiving system according to claim 1, wherein the system further comprises:

a transfer device determining means for determining the transfer device for use by the user, based on a result of predicting the user's location and a transfer device determining rule for determining the transfer device in accordance with the user's location; and a mail transfer means, substituting to said mail transfer means, for transferring said electronic mail addressed at said user and stored in said mail system to the transfer device determined by said transfer device determining means, if the transfer is approved by periodically referring to the transfer propriety data at designated time intervals and if an electronic mail is stored in the mail system.

4. An electronic mail transmitting and receiving system according to claim 3, wherein said transfer device determining means is constructed such that it anticipates said user's location based on the schedule information of said user.

5. An electronic mail transmitting and receiving system according to claim 3, the system further comprises:

a transmitting information quantity determining means for determining a controlling method of a transmitting information quantity based on a transmitting information quantity determining rule for determining a controlling method of the transmitting information quantity corresponding to the type of the transfer device and the type of the transfer device determined by the transfer device determining means; wherein, when transferring said electronic mail, said mail transfer means controls the transmitting information quantity of said electronic mail in accordance with said controlling method determined by the transmitting information quantity determining means.

6. A method of transmitting and receiving an electronic mail of an electronic mail transmitting and receiving system comprising a mail system for storing electronic mail addressed at a user and for transmitting said stored electronic mail according to the user's demand to receive the electronic mail, the method comprises the steps of:

monitoring the state of arrival of the electronic mail addressed at said user and the states of transmission and reception of the electronic mail by said user;

generating a transfer propriety data which indicates whether or not the electronic mail addressed at said user and stored in said mail system can be transferred, based on the above described states of arrival, transmission and reception;

transferring the mail addressed at said user and stored in the mail system to a predetermined, address for said user, as far as it is confirmed by the periodical reference to said transfer priority data that the transfer is possible, and as far as the mail system stores the electronic mail addressed at said user.

7. A method of transmitting and receiving an electronic mail according to claim 6, wherein said monitoring step monitors the date and time of arrival of said electronic mail as the state of arrival of said electronic mail, monitors the date and time of transmission of the electronic mail as the state of transmission of said electronic mail, and monitors the date and time of reception of the electronic mail as the state of reception of said electronic mail;

said transfer propriety data generating step, when generating said transfer propriety data, obtains access intervals which correspond to average values of intervals between said transmitting and receiving dates and times and the time when said user accesses the mail system, and storing times which are average values of storing times between said transmitting and said receiving dates and times and the storing time while the electronic mail is stored in the mail system; and said transfer propriety data generating step, based on the access interval, the storing time, and the latest date and time at which the mail system is accessed by the user, anticipates whether or not the user is able to access the mail system and generates a transfer propriety data based on the result of the anticipation.

8. A method of transmitting and receiving electronic mail according to claim 6, the method further comprising the steps of:

determining a transfer device based on the transfer device determining rule for determining said transfer device to be used by said user with reference to the location where the user is present; and substituting to said mail transferring step, transferring said mail addressed at said user to the transfer device determined by said transfer device determining step, as far as said transfer propriety data approves the transferby periodically referring to the transfer propriety data at designated intervals, and also as far as the electronic mail addressed at said user is stored in said mail system.

9. A method of transmitting and receiving the electronic mail according to claim 8, wherein, in said step of determining the transfer device, the location where the user is present is anticipated from schedule information of said user.

10. A method of transmitting and receiving the electronic mail according to claim 8, wherein the method further comprises the steps of determining a transmitting information quantity controlling method for determining a transmission information quantity of the electronic mail based on the transmitting information quantity determining rule for determining the controlling method of the transmitting information quantity and the type of the transfer device determined in said transfer device determining step;

wherein, in said mail transferring step, when transferring said electronic mail, the transmitting information quantity of said electronic mail is controlled by the controlling method determined by said transmitting information quantity controlling method.

11. A mechanically readable recording medium storing a program for operating a computer, which stores an electronic mail addressed at a user and which is provided with a mail system for transmitting the electronic mail stored in the mail system to said user in response to the user's demand, as:

a mail system monitoring means for monitoring the arrival of an electronic mail addressed at said user and the states of transmission and reception of electronic mail by said user;

a transfer propriety data generating means for generating a transfer propriety data which indicates whether or not it is appropriate to transfer the electronic mail addressed at said user and stored in said mail system based on the state of arrival, transmission, and reception of the electronic mail obtained by the mail system monitoring means; and a mail transfer means for transferring said electronic mail addressed at said user and stored in the mail system to an address predetermined for said user, if the transfer is approved by periodically referring to the transfer propriety data at a designated time interval and if an electronic mail is stored in the mail system.

12. A method of transmitting and receiving electronic mail based on a user's availability, comprising the steps of:

automatically storing incoming electronic mail in a user data memory;

determining a time interval that denotes when the user has accessed the data memory, the time interval being a time difference between an arrival time of the electronic mail and an access time by the user;

averaging the time interval for each instance that the user has accessed the data memory;

determining that the user is present if the average time interval is less than a predetermined time interval, and that the user is absent if the average time interval is greater than the predetermined time interval; and sending the incoming electronic mail to an auxiliary transfer device when the user is absent.

\* \* \* \* \*